Oct. 21, 1958  F. F. BRUCH  2,856,972
SLIDABLE TABLE FOR MEAT AND BONE SAWS
Filed May 1, 1957  3 Sheets-Sheet 1

INVENTOR:
FRANK F. BRUCH
BY
Margall, Johnston, Cook & Root
ATT'YS

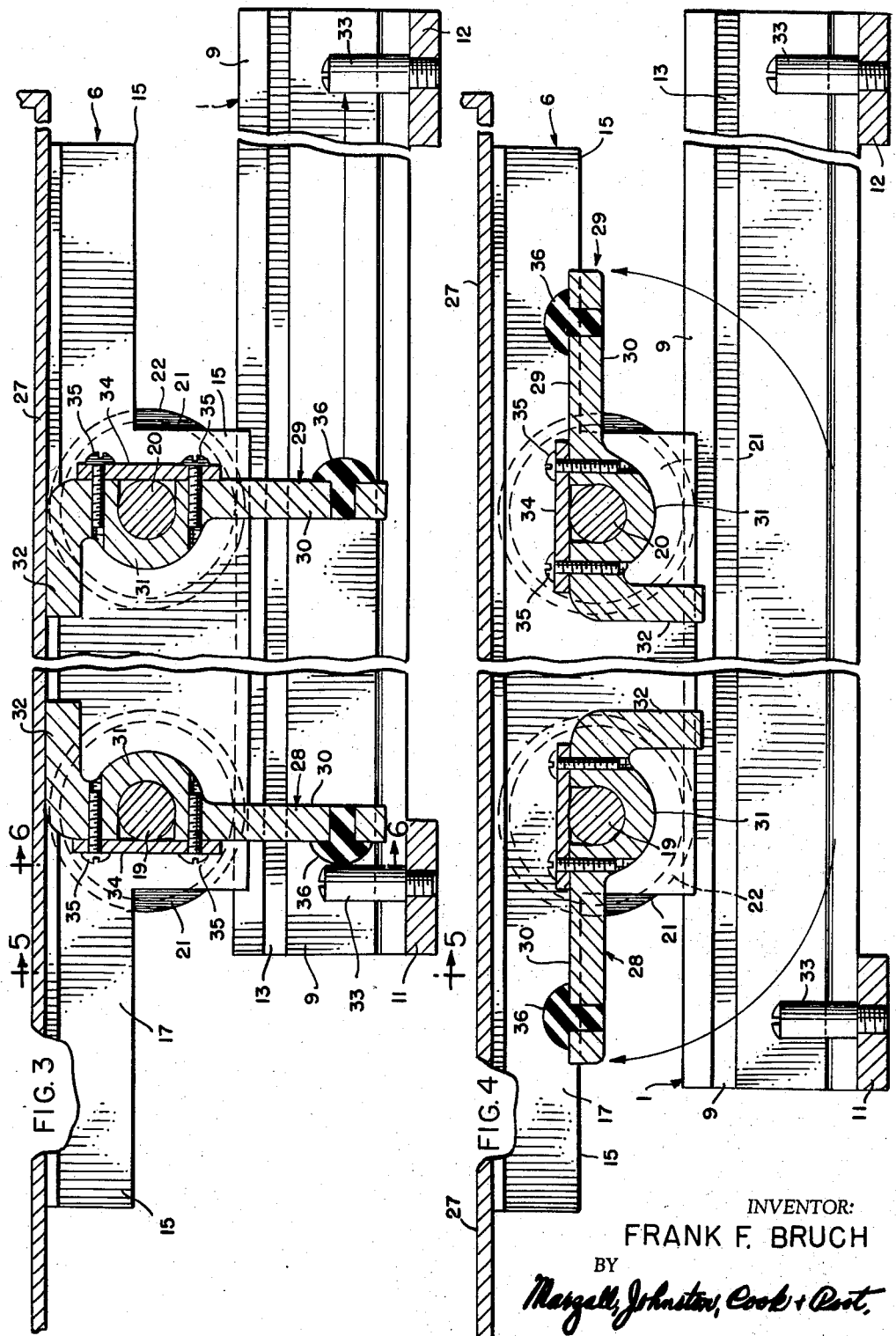

Oct. 21, 1958 F. F. BRUCH 2,856,972
SLIDABLE TABLE FOR MEAT AND BONE SAWS
Filed May 1, 1957 3 Sheets-Sheet 3
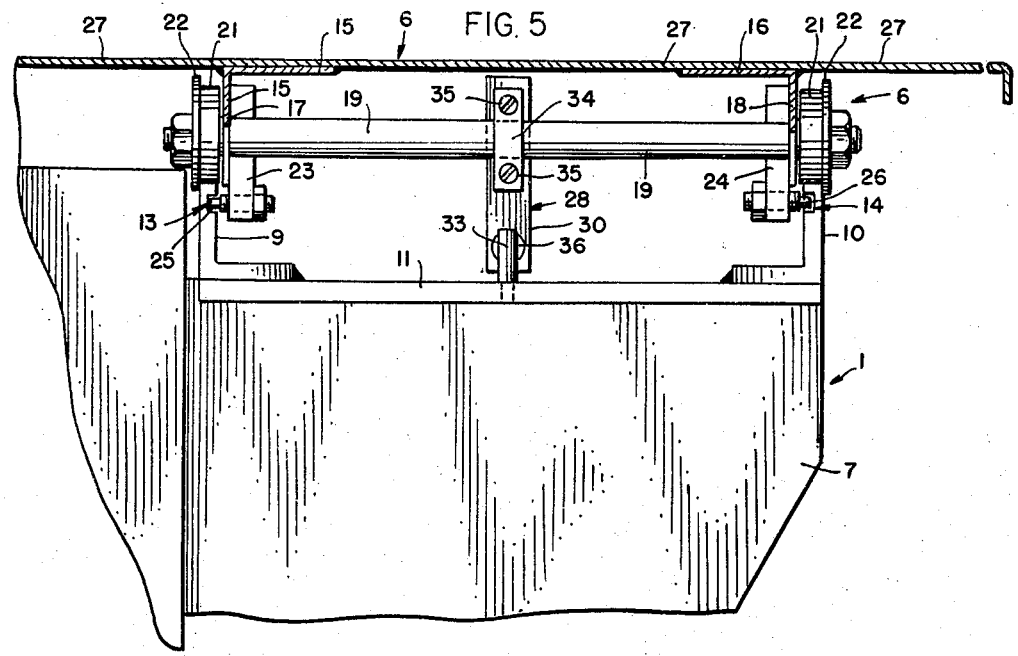
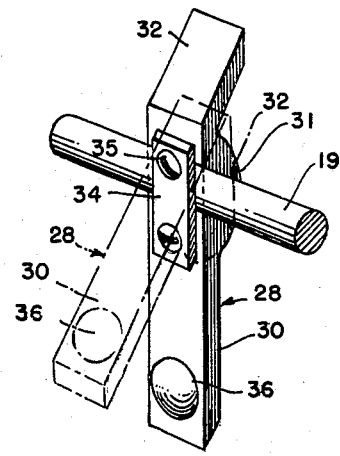
INVENTOR:
FRANK F. BRUCH
BY
ATT'YS

United States Patent Office

2,856,972
SLIDABLE TABLE FOR MEAT AND BONE SAWS

Frank F. Bruch, Chicago, Ill., assignor to U. S. Slicing Machine Company, Inc., La Porte, Ind., a corporation of Indiana Application May 1, 1957, Serial No. 656,308

3 Claims. (Cl. 143—25)

This invention relates in general to a power meat and bone saw of the type disclosed in United States Letters Patent No. 2,492,824, issued December 27, 1949, to A. H. Ahrndt et al., and assigned to the present assignee. More specifically, the invention relates to a slidable meat table for such meat and bone saws.

The invention consists of a slidable substance table which is mounted on rails for movement in a rectilinear path transversely; that is, movable from one side to the other, right and left, Figs. 1 and 2. The axles or rods, carrying the wheels, which support the table, have mounted intermediate their ends, particularly centrally thereof, stop fingers which are frictionally mounted on the axles. The frictional mounting of the fingers on the axles maintain the fingers in a predetermined position, and allow the fingers to be shifted into and out of operative position. These stop fingers each carry an extension or tail piece at the outer end to prevent the fingers from being rotatively shifted beyond a certain predetermined position. Each finger is adapted to be engaged by an upstanding abutment to prevent the table from moving beyond a certain normal outward limit. The stop fingers may be revolubly shifted to free them from the stops and thus permit the table to be completely removed from its frame for cleaning or other purposes.

The primary object of the invention is to provide new and improved means for slidably positioning a table in a rectilinear path along a frame.

Another object of the invention consists in the provision of stop fingers which are adapted for engagement with stops to limit the slidable movement of the slide table or carriage, the fingers being revolubly, but frictionally, mounted to permit manual, shiftable, arcuate movement of the fingers to move them out of the path of the fixed stops to remove the table.

A still further object of the invention consists in the novel means for guiding a slidable table along a rectilinear path, there being new and improved stop fingers adapted for selected engagement with fixed stops to limit the travel of the table in each direction, or to permit the table to be entirely removed from its supporting structure.

Numerous other objects and advantages will be apparent throughout the progress of the specification which is to follow.

The accompanying drawings illustrate a certain selected embodiment of the invention, and the views therein are as follows:

Fig. 3 is a detail longitudinal sectional view on the line 3—3 of Fig. 2, but showing the table at one extreme end with a finger engaging a fixed stop.

Fig. 4 is a view similar to Fig. 3, but showing the stop fingers in their raised position to permit the table to be removed;

Fig. 5 is a transverse sectional view looking in the direction of the arrows 5—5 of Fig. 3; and Fig. 6 is a detail perspective view looking in the direction of the arrows 6—6 of Fig. 3, and showing the manner in which a stop finger may be manually shifted into, or out of, stop position.

Figure 1:
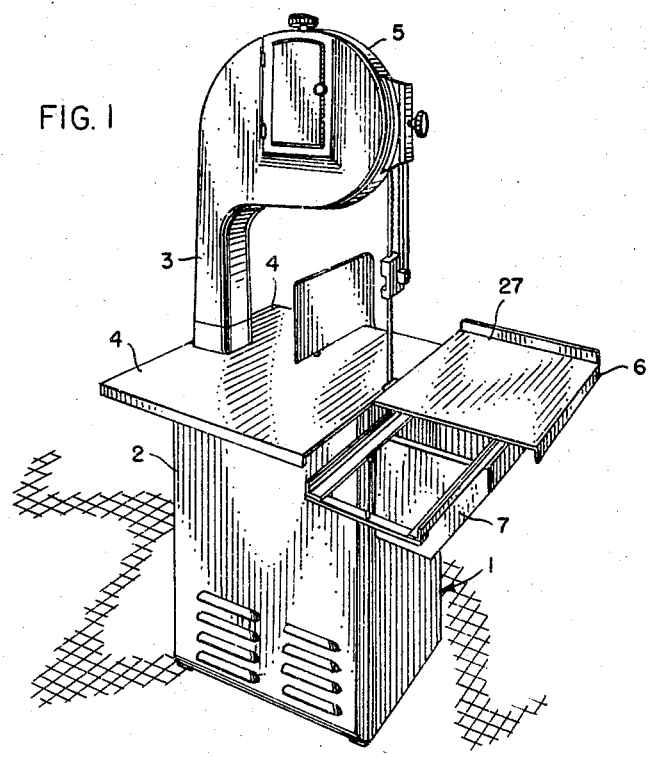
Fig. 1 is a detail perspective view of a power-operated meat and bone saw and embodying the invention.
Figure 2:
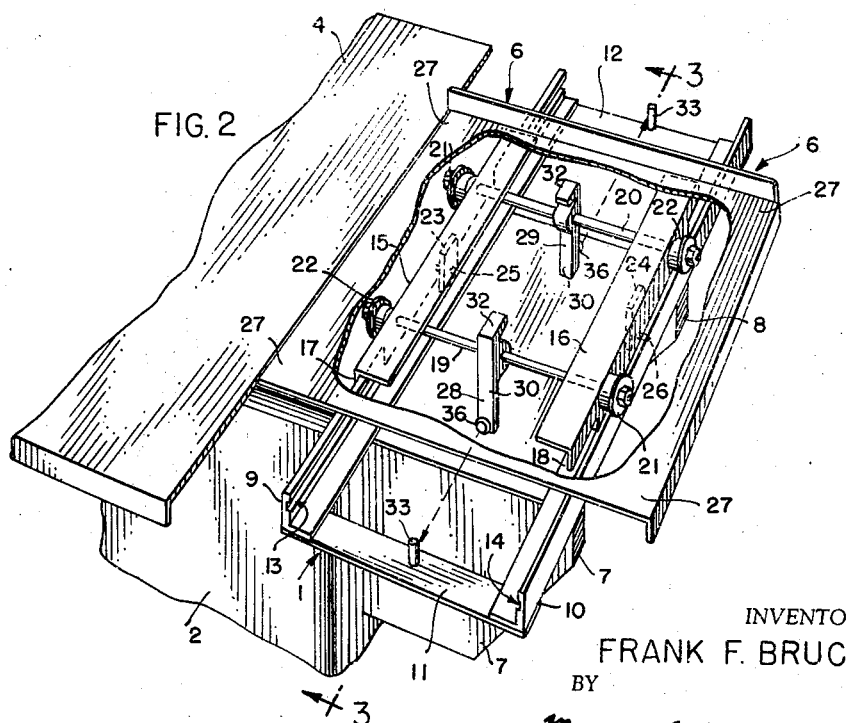
Fig. 2 is a detail perspective view of the slidable table, the table top being broken away to show the underlying frame construction and of the manner in which the table is mounted.

The particular meat and bone saw herein shown for the purpose of illustrating the invention comprises a main machine frame 1, Figs. 1 and 2, having a lower base section to form a lower cabinet 2, Fig. 1. An upstanding vertical column or hood 3 extends upwardly from the top of a stationary table 4 which is mounted on the frame above the top of the lower cabinet 2. The vertical column or hood 3 terminates at its upward end into a housing 5 which may be formed integrally with the column 3, and which houses an upper saw pulley and a saw tensioning device, both of the latter not being shown.

A slidable table 6 is mounted on top of the main frame structure 1, and has its inner edge closely adjacent an edge of the stationary table 4 and in the same horizontal plane, as clearly shown in Figs. 1 and 2. The main structure or frame 1 includes a support upon which the slidable table is adapted to slide in a rectilinear path.

The support part of the main frame 1 includes a pair of spaced forwardly projecting brackets 7 and 8, Fig. 2. Horizontal spaced guides, in the form of angle irons, 9 and 10 are mounted on top of the brackets 7 and 8. These angle iron guides 9 and 10 are connected at, or adjacent, their outer ends by cross members 11 and 12 which may be in the form of flat metal plates welded or otherwise secured to the flat bottom surfaces of the angle irons 9 and 10. The angle irons 9 and 10 are provided on their inner surfaces with grooves or guideways 13 and 14, respectively.

A pair of spaced apart opposed inverted angle irons 15 and 16, Figs. 2 and 5, are juxtaposed with respect to the angle irons 9 and 10. The downwardly extending legs 17 and 18 of the inverted angle irons 15 and 16 are arranged inwardly of the vertical legs of the angle iron members 9 and 10. Shafts or axles 19 and 20 pass through the vertical legs 17 and 18 of the angle members 15 and 16, and a rotary mounted wheel 21 is mounted on the end of each of the axles 19 and 20. The wheels 21 ride upon the tops of the vertical legs of the angle irons 9 and 10, each wheel 21 having an outer flange 22 which acts as a guide for the slidable table 6 during its slidable movement on top of the angle members 9 and 10. The angle irons 15 and 16 have blocks 23 and 24 fixed on the inside of their legs and outwardly projecting pins 25 and 26 are received in the guide grooves 13 and 14 of the angle irons 9 and 10, respectively. A top 27, such as a sheet of stainless steel metal, is fixed to the top of the angle members 15 and 16 to provide a table top for the slide table 6. Stop fingers 28 and 29 are mounted on the axles 19 and 20, the fingers being substantially arranged midway of the outer ends of the axles 19 and 20.

The stop fingers 28 and 29 each comprise a finger part 30 and a curved part 31, the curved part providing a recess to partly enclose an axle 19 or 20, and acts as a bearing therefor. The upper ends of the fingers 28 and 29 terminate in an inwardly bent portion or tail piece 32 which normally engages the underside of the table top 27 when the table 6 is in normal operative position, the tail piece or bent part 32 limiting the rotative movement of the fingers 28 and 29 about their respective axes so that when the finger part 30 strikes a fixed stop 33 on the tie members 11 or 12, Figs. 3 and 4, the projection or tail piece 32 normally lies against the underside of the table top 27 and prevents rotative movement of the fingers 28 and 29 with respect to their supporting axles 19 and 20, respectively. The engagement of the tail pieces keeps the fingers rigid for engagement with the fixed stops 33.

The fingers 28 and 29 are frictionally secured to their respective axles 19 and 20 by means of a plate 34 held in position by screws 35, 35 engaging the fingers to lock the curved part 31 of each finger 29 or 30 about the axle 19 or 20. The outer end of the finger part 30 of each finger 28 and 29 is provided with a rubber bumper 36 which will strike a fixed stop 33 to limit the to-and-fro slidable movement of the table 6. Each finger 28 and 29, therefore, is mounted in its normal downwardly extending vertical position and is held in such position by reason of the tail pieces engaging the bottom of the table. However, the fingers 28 and 29 may be manually rotated, as shown in Fig. 6, to move the fingers from the vertical position shown in Fig. 3 to the horizontal position shown in Fig. 4, whereupon the fingers are removed from abutting engagement with their cooperating fixed stops 33, and thus permit the table 6 to be slid off its supporting rails and removed from the supporting frame for adjustment, cleaning, and otherwise. The fingers 28 and 29 are in their normal downward position for stop purposes as shown in Figs. 2 and 3, and when rotated bodily about their respective axles 19 or 20, allow removal of the slide table 6. The frictional engagement of each finger 28 and 29, with respect to the axle upon which it is mounted, is such to permit the fingers to be shifted to inoperative position so that the slide table may be removed, the fingers being held in such inoperative position by frictional engagement with the axles. The fingers 28 and 29 may be manually returned to their normal, operative, downward position so as to cooperate again with the fixed stops 33, and thus limit the to-and-fro slidable movement of the table 6.

The horizontal legs of the angle iron members 15 and 16 extend inwardly, as clearly shown in Fig. 3, and are welded to the underside of the table top 27, whereby the table top, the angle members 15 and 16, the shafts or axles 19 and 20, and the stop fingers 28 and 29 comprise a single unitary slide table which may be detached from the lower supporting rails or angle irons 9 and 10 to permit the entire table 6 to be removed from its underlying lower frame structure.

The invention provides a slidable table which has its slidable movement normally limited by projecting the fingers 28 and 29 downwardly, engaging fixed stops. The entire table may be removed by manually shifting the fingers to a horizontal position, as shown in Fig. 4, whereupon the stop fingers 28 and 29 are brought out of engagement with their cooperating abutments 33, continued slidable movement of the table removing it from its support.

Changes may be made in the form, construction and arrangement of the parts without departing from the spirit of the invention or sacrificing any of its advantages, and the right is hereby reserved to make all such changes as fall fairly within the scope of the following claims.

The invention is hereby claimed as follows:

1. A meat and bone saw comprising an underlying frame including spaced rails, a slide table structure slidable on the rails in a rectilinear path, fixed stops on each end of the frame, said table structure comprising a top having legs extending downwardly therefrom, guide means on the rails and table structure to guide the table structure, spaced axles mounted on said legs, wheels mounted on axles at the ends thereof and rolling on the rails, stop fingers on the axles intermediate the ends thereof for engagement with the fixed stops to limit the slidable movement of the table in each direction, said fingers being pivotally mounted to the axles of the table structure, means to limit the pivotal movement of the fingers on the axles, and means applying a friction on the fingers against the axles, said fingers being rotatable to move the fingers out of the path of said stops to permit the table structure to be removed from the frame, said means to limit the rotative movement of the stop fingers on the axles including turned integral inwardly extending tail pieces on the fingers and turned toward each other and engageable with the underside of the table top.

2. A meat and bone saw comprising an underlying frame including spaced rails, a slide table structure slidable on the rails in a rectilinear path, fixed stops on each end of the frame, spaced axles on the table having wheels at the ends thereof and rolling on the rails, stop fingers on the axles intermediate the ends thereof for engagement with the fixed stops to limit the slidable movement of the table in each direction, said fingers being pivotally mounted to the axles, means to limit the pivotal movement of the fingers on the axles, and means applying a friction on the fingers against the axles, said fingers being rotatable to move the fingers out of the path of said stops to permit the table structure to be removed from the frame, said means to limit the rotative movement of the stop fingers on the axles including tail pieces turned over at the upper ends of the fingers and facing each other and engageable with the underside of the table top.

3. A power-operated meat and bone saw comprising a frame, a stationary table mounted on said frame and a slidable table slidably mounted on a part of said frame and arranged adjacent the stationary table, said slidable table comprising a pair of spaced longitudinal elements, axles carried by said elements, wheels mounted on said axles and riding on a part of the frame, fingers rotatively mounted on said axles, and rigid abutments on a part of the frame, said stop fingers each comprising means for fastening a finger to an axle, said fingers being shiftable in one position for engagement with the fixed abutments and to limit the slidable movement of the slidable table at the end of its travel in either direction by engagement of the fingers with the rigid stops, said shiftable fingers each having a tail piece at the end of the finger and engageable with the underside of the table top to prevent rotative movement of a finger when it strikes the fixed abutment, said shiftable fingers being manually movable in an arc to move the finger above the abutment and out of engagement with the abutments to permit the table to be slid in either direction for removal from its supporting frame.

References Cited in the file of this patent

UNITED STATES PATENTS

| | | |
|---|---|---|
| 1,923,853 | Van Duyn | Aug. 22, 1933 |
| 2,371,401 | Martin | Mar. 13, 1945 |
| 2,445,676 | Lasar | July 20, 1948 |
| 2,448,354 | Cintron | Aug. 31, 1948 |
| 2,492,824 | Ahrndt et al. | Dec. 27, 1949 |
| 2,548,279 | Young | Apr. 10, 1951 |
| 2,807,291 | Brown | Sept. 24, 1957 |